Dec. 30, 1930.                G. D. RABUN                 1,786,449
                          TROLLEY WIRE CONTACTOR
                    Filed Oct. 30, 1926        2 Sheets-Sheet 1
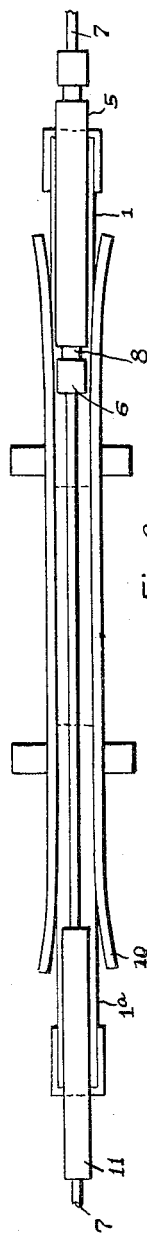
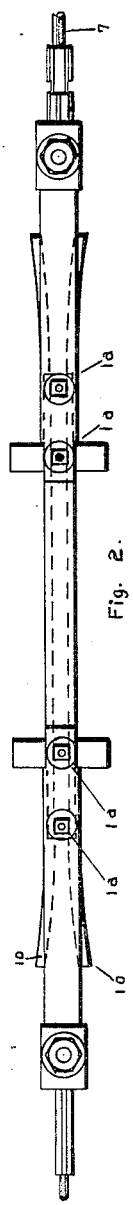
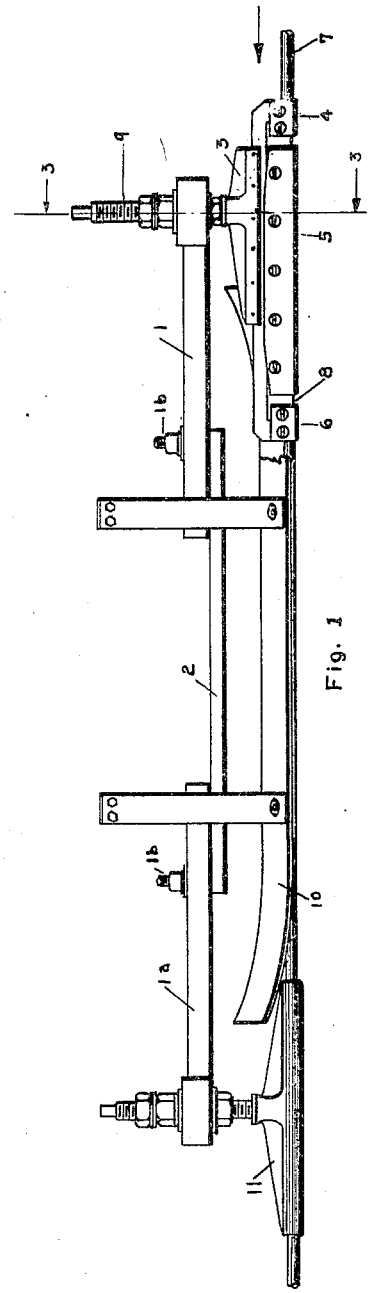
INVENTOR.
George D. Rabun
BY John L. Milton
ATTORNEY

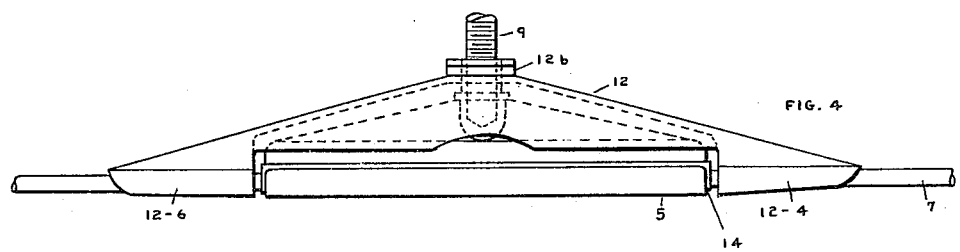
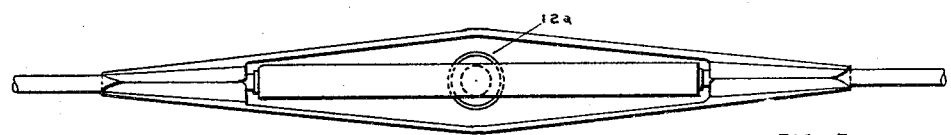
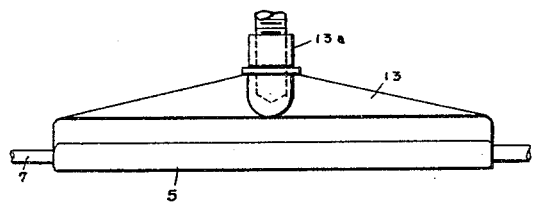
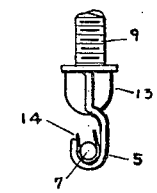

Patented Dec. 30, 1930

1,786,449

UNITED STATES PATENT OFFICE

GEORGE D. RABUN, OF LOUISVILLE, KENTUCKY, ASSIGNOR TO CHEATHAM ELECTRIC SWITCHING DEVICE COMPANY, OF LOUISVILLE, KENTUCKY

TROLLEY-WIRE CONTACTOR

Application filed October 30, 1926. Serial No. 145,273.

My invention relates to trolley wire contactors and has more particular reference to improvement in apparatus of the class known as trolley pans.

One of the objects of my invention is to provide an improved device of this character which will be simple and durable in construction with the use of less material than ordinarily employed in similar apparatus and at the same time increasing its effectiveness and efficiency in operation.

To the obtainment of these ends and the accomplishment of the new and useful objects hereinafter appearing, my invention consists in the features of novelty disclosed in the construction and combination and arrangement of parts herein described and claimed, and shown in the accompanying drawings illustrating the embodiments of my invention and wherein:

Figure 1—is an elevation of a trolley contactor embodying my invention plus a current diagram. Fig. 2—is a top plan view of Fig. 1. Fig. 3—is an enlarged longitudinal view along the line 3—3 of Fig. 1 shown partially in cross-section. Fig. 4—is an elevation of a modified form of my depending ear. Fig. 5—is a bottom view of Fig. 4. Fig. 6—is an elevation of the central shoe member of Figures 4 and 5. Fig. 7—is an end view of Fig. 6. Fig. 8—is a bottom view of Fig. 1.

The device shown in the drawings and illustrating the embodiments of my invention is a so called trolley pan used on a trolley wire at points adjacent an electrical track switch throwing device and is employed in connection with a trolley wheel, suitable solenoids and circuits including a circuit changer to direct the operation of the track switch from a passing car on which the trolley wheel is carried, the selection having been determined by the motorman going under the trolley pan with "power on" or "power off." 1—1a indicate insulated sections of the body member of my trolley pan which is secured to a metallic back-bone 2 by bolts 1b. From the insulated member 1, I employ a depending ear member 3 to which is attached a series of shoes 4—5—6, 4 and 6 being secured directly to trolley wire 7 and insulated from ear 3, while shoe 5 is insulated from the trolley wire by insulating material 8, said shoe being in electrical contact with supporting screw 9 thru ear 3. Shoes 4 and 6 which are readily renewed, are provided as wear members to protect section 5 from the normal hammering and abrasion produced by the trolley wheel. Ear 11 is of the well known type for holding a wire directly to body member 1a.

The depending ear illustrated in Figures 4 and 5 is my preferred, as well as the commercial form of this part of my invention. 12 is an integral or unitary casting provided with means for clamping its ends 12—4 and 12—6 to trolley wire 7. In hole 12—a, I mount supporting screw 9, around which is placed insulating collar 13a and washer 12b so that central member 5 will be completely insulated from 12. Shoe 5 should be regarded as an insulated section of the trolley pan directly disposed in the path of trolley wheel groove so that it may have a smooth course of travel. Between the inner surface of 5 and trolley wire 7, I place a strip of insulating material 14. This arrangement provides a maximum insulation for a given space to protect against surface leakage. In Fig. 5, which is a true and full bottom view of Fig. 4, I have shown the clamping ends 12—4, 12—6, as embracing trolley wire 7. The entire integral casting 12 is preferably made of a high grade malleable metal so that said ends will possess sufficient pliancy to admit of the necessary hammering, or other forming means to shape same as shown in these figures from a sufficiently open form, to embrace trolley wire 7 in accordance with accepted standard practice.

In operation the trolley wheel strikes shoe 4 and then rolls gently on to shoe 5 without shock to the latter and then to shoe 6 and back on to the trolley wire 7. It is of course obvious that in backing up the reverse order will take place. I wish to stress the value of the protection shoes 4 and 6 give to the insulated shoe 5. As the wheel progresses in the direction shown by the arrow, it next engages flexible contact strips 10—10 without leaving the wire and thereby directs current according to attached circuits and apparatus.

I claim:

1. In apparatus of the class described, the combination of a body member adapted for attachment to a trolley wire and having an integral contact shoe insulated from but embracing and holding said wire to said body.

2. In apparatus of the class described, the combination of a body member adapted for attachment to a trolley wire and having a plurality of shoes surrounding and holding said wire to said body, one of said shoes being of unitary structure and insulated from said wire.

3. In apparatus of the class described, the combination of a body member adapted for attachment to a trolley wire and having a plurality of shoes surrounding and holding said wire to said body, one of said shoes being of unitary structure and insulated from said wire and one of said shoes being so disposed that it forms a wear member for protecting said insulated member.

4. In apparatus of the class described, the combination of a body member adapted for attachment to a trolley wire and having a plurality of shoes surrounding and holding said wire to said body, one of said shoes being of unitary structure and insulated from said wire, each of said shoes being disposed on each side of said insulated shoe so that they form a wear member for protecting said insulated member.

5. In apparatus of the class described, the combination of a body member adapted for attachment to a trolley wire through a plurality of shoes and having a contact shoe insulated from but surrounding and holding said wire to the body, said body member also carrying a flexible contact member.

6. In apparatus of the class described, the combination of a body member adapted for attachment to a trolley wire and having a plurality of contact shoes surrounding and holding said wire to said body, one of said shoes being insulated from said wire, said body member also carrying a flexible contact member.

7. In combination with a trolley collector and a trolley pan comprising an integral frame provided with pliant shoes for engagement with a trolley wire and an interposed shoe insulated from said frame and trolley wire, said shoes being disposed for contact with a groove in said collector.

8. In a trolley pan comprising an integral frame provided with pliant shoes for engagement with a trolley wire and an interposed shoe insulated from said frame and trolley wire, said shoes being planimetrically disposed.

9. In combination with a trolley collector and a trolley pan provided with an insulated electrical contactor surface embraced by two linearly disposed electrical contact surfaces fashioned from an integral structure, said shoes being disposed for contact with a groove in said collector.

10. In combination with a current collector and a trolley pan provided with an insulated electrical contactor surface embraced by two other linearly disposed electrical contact surfaces, said surfaces being disposed for contacting with a groove in said collector.

11. In combination with a current collector and a trolley pan provided with an insulated electrical contactor surface embraced by two other linearly disposed electrical contact surfaces, and provided with another surface for electrical contact with the current collector.

12. In a trolley pan provided with an insulated electrical contactor surface embraced by two other planimetrically disposed contact surfaces which are electrically connected.

13. In a trolley pan provided with an insulated electrical contactor surface embraced by two other linearly disposed contact surfaces which are electrically connected, said trolley pan also being provided with another adjacent insulated contact surface.

14. In a trolley pan provided with an insulated electrical contactor surface embraced by two other linearly disposed electrical contact surfaces which are electrically connected, said trolley pan also being provided with other adjacent insulated flexible contact surfaces.

15. In a trolley pan provided with an insulated electrical contactor surface embraced by two other linearly disposed electrical contact surfaces which are electrically connected, said trolley pan also being provided with other adjacent insulated substantially parallel contact surfaces.

16. In combination with a current collector and a trolley pan provided with an insulated electrical contact surface embraced by two other linearly disposed electrical contact surfaces, said surfaces being disposed for contact with a groove in said collector, said trolley pan also being provided with another adjacent insulated contact surface disposed for contact with the flange of said current collector.

17. In combination with a current collector and a trolley pan provided with an insulated electrical contact surface embraced by two other linearly disposed electrical contact surfaces, said surfaces being disposed for contact with a groove in said collector, said trolley pan also being provided with other adjacent insulated contact surfaces disposed for contact with the flange of said current collector.

18. In combination with a current collector and a trolley pan provided with an insulated electrical contact surface embraced by two other linearly disposed electrical contact surfaces, said surfaces being disposed for contact with a groove in said collector, said trolley pan also being provided with another adjacent insulated contact surface disposed for contact with the flange of said current collector simultaneously with the contact of the groove in said collector with the said insulated electrical contact surface.

In testimony whereof I affix my signature.

GEORGE D. RABUN.